(12) United States Patent
Guerreiro

(10) Patent No.: US 8,221,563 B2
(45) Date of Patent: Jul. 17, 2012

(54) METHOD OF MAKING A DIESEL-ENGINE CRANKSHAFT

(75) Inventor: Sergio Stefano Guerreiro, Jardim Pagliato (BR)

(73) Assignee: Thyssenkrupp Metalurica Campo Limpo Ltda, Campo Limpo Paulista-SP (BR)

( * ) Notice: Subject to any disclaimer, the term of this patent is extended or adjusted under 35 U.S.C. 154(b) by 38 days.

(21) Appl. No.: 12/594,024

(22) PCT Filed: Apr. 14, 2008

(86) PCT No.: PCT/IB2008/000911

§ 371 (c)(1),
(2), (4) Date: Dec. 30, 2009

(87) PCT Pub. No.: WO2008/125964

PCT Pub. Date: Oct. 23, 2008

(65) Prior Publication Data

US 2010/0126638 A1   May 27, 2010

(30) Foreign Application Priority Data

Apr. 16, 2007 (DE) .......................... 10 2007 018 230
Aug. 23, 2007 (EP) ...................................... 07016546

(51) Int. Cl.
*C01D 9/30* (2006.01)

(52) U.S. Cl. ....................................... 148/545; 148/617

(58) Field of Classification Search ........................ None
See application file for complete search history.

(56) References Cited

U.S. PATENT DOCUMENTS

| | | | | |
|---|---|---|---|---|
| 2,028,281 A | | 7/1981 | Hayes | 148/321 J |
| 4,880,477 A | * | 11/1989 | Hayes et al. | 148/545 |
| 5,028,281 A | * | 7/1991 | Hayes et al. | 148/321 |
| 5,064,478 A | * | 11/1991 | Kovacs et al. | 148/615 |
| 6,258,180 B1 | * | 7/2001 | Wilde et al. | 148/321 |
| 2006/0040125 A1 | * | 2/2006 | Obara et al. | 428/556 |
| 2007/0143997 A1 | | 6/2007 | Behr | 29/888.08 |

FOREIGN PATENT DOCUMENTS

| | | | |
|---|---|---|---|
| JP | 59-129730 A | * | 7/1984 |
| JP | 59129730 | | 7/1984 |

OTHER PUBLICATIONS

Putadunda SK: "Dvelopment of austempered ductile cast iron with simultaneous high yield strength and fracture toughness by a novel two-step austempering process" Material Science and Engineering A: Structural Materials: Properties, Microstructure & Processing, Lausanne, CH vol. A315, Sep. 30, 2001, pp. 0921-5093.

Kovacs SR BV: "Development of Austempered Ductile Iron (ADI) for Automobile Crankshafts" Journal of Heat Treating, Springer Verlag, New York, US vol. 5, No. 1, Jan. 1, 1987, pp. 55-60.

* cited by examiner

*Primary Examiner* — George Wyszomierski
(74) *Attorney, Agent, or Firm* — Andrew Wilford

(57) ABSTRACT

The invention relates to a method for producing a crankshaft, in special for diesel engines, wherein a crankshaft blank is produced from austempered ductile cast iron, the casting blank is subjected to heat treatment matched to the austempered ductile cast iron whereby the blank acquires high strength and hardness. According to the invention, surfaces which form bearing surfaces for connecting rods and shaft bearings are undersized before the ADI heat treatment. Following the heat treatment a coating is applied to the bearing surfaces, the layer thickness being matched to the undersize and dimensional deviations as a result of the heat treatment. The coated bearing surfaces are finally finish-machined to the finished size without the need of machining the bearing surfaces of the casting blank after the heat treatment.

5 Claims, No Drawings

METHOD OF MAKING A DIESEL-ENGINE CRANKSHAFT

CROSS REFERENCE TO RELATED APPLICATIONS

This application is the US national phase of PCT application PCT/IB2008/000911, filed 14 Apr. 2008, published 23 Oct. 2008 as WO2008/125964, and claiming the priority of German patent application 102007018230.0 itself filed 16 Apr. 2007 and European patent application 07016546.9 itself filed 23 Aug. 2007, whose entire disclosures are herewith incorporated by reference.

DESCRIPTION

The invention relates to a method for producing a crankshaft, in particular for diesel engines, wherein a crankshaft blank is produced from austempered ductile cast iron (ADI), the casting blank is subjected to heat treatment matched to the austempered ductile cast iron whereby the blank acquires high strength and hardness.

Austempered ductile iron (ADI) is a low-warping, isothermally quenched and tempered cast iron with spheroidal graphite. The material is characterised by a favourable combination of strength and elongation as well as high fatigue strength and favourable wear behaviour. Cast iron with spheroidal graphite (GGG) forms the basis for ADI, the melts usually being alloyed with small quantities of copper, molybdenum, manganese and nickel. The cast workpieces are heated in a furnace in a protective gas atmosphere to an austenitisation temperature of 850 to 950° C. and after holding for several hours, are quenched to a temperature between 220 and 450° C. At this temperature a structural transformation takes place with the formation of a bainite-like structure consisting of acicular carbide-free ferrite and carbon-enriched stabilised residual austenite.

As a result of the good mechanical properties—high ductility, tensile strength, wear resistance, hardness and good elongation properties—austempered ductile cast iron is also used in mechanical engineering and in the automotive industry. It is very difficult to machine the castings after the ADI heat treatment and in most cases, this is only possible by grinding. For this reasons, in many cases the castings must be machined to size before the heat treatment. In this case, the thermal distortion and changes in volume caused by structural transformation must be taken into account. Production is expensive and there is a large amount of waste since there is no possibility or only a very limited possibility of machining after the heat treatment. In the case of complex geometries of mechanical parts, e.g. crankshafts and connecting rods, it is difficult to produce dimensionally stable bearing surfaces for connecting rods and shaft bearings, with the tolerances required in practice, in special after the required heat treatment for ADI casting material.

It is the object of the invention to simplify the method for producing crankshafts made of austempered ductile cast iron and in particular, to carry out the method in such a manner that the dimensional accuracy of the bearing surfaces for connecting rods and shaft bearings after the heat treatment can be ensured in a simple manner.

Starting from a method having the features described initially, the object is achieved according to the invention whereby surfaces which form bearing surfaces for connecting rods and shaft bearings are undersized prior to the ADI heat treatment. Following the heat treatment a coating is applied to the bearing surfaces, the layer thickness being matched to the undersize and dimensional deviations that result from the heat treatment. Finally the coated bearing surfaces are finish-machined to the final geometric dimensions without the need of machining the bearing surfaces of the casting blank after the heat treatment.

The casting blank can be machined prior to the ADI heat treatment to undersize the surfaces of the blank which form the bearing surfaces.

The coating is appropriately deposited to the bearing surfaces after the heat treatment process and before final machining of the bearing surfaces with a coating thickness between 100 µm and 800 µm, for example by means of using a Plasma or Thermal Spray Coating deposited on the bearing surfaces. The coating shall be machined to the final dimension and form of the bearing surfaces. By means of the finish-machining 20% to 80% of the coating applied to the bearing surfaces is removed again. Therefore, significantly less waste is produced compared to the state of the art processes, where the casting blank itself is machined in order to obtain the bearing surfaces.

Austempered ductile iron imparts high strength and hardness to the crankshaft. The thin coating on the bearing surfaces is deposited after the ADI heat treatment and makes it possible to machine the bearing surfaces without the need to machine the ADI casting. The coating thickness shall compensate dimensional deviations caused by the heat treatment. As a result of the machining of these surfaces, high requirements both with regard to the surface quality of the machined surfaces and also with regard to the dimensional consistency of the machined surfaces can be maintained. The combination of process steps according to the invention allows crankshafts in special for the so called light duty and mid-range duty diesel engines, to be manufactured cost-effectively and substantially with less waste, these crankshafts being characterised by excellent mechanical properties and also by very good dimensional consistency at the bearing surfaces for connecting rods and shaft bearings.

The ADI heat treatment of the cast workpiece comprises heating the cast workpiece in a protective gas atmosphere to an austenitisation temperature of 850 to 950° C., quenching the cast workpiece to a microstructural transformation temperature between 220 and 450° C. and holding the microstructural transformation temperature for several hours for isothermal transformation of the microstructure. The temperature of the isothermal transformation influences the microstructure being formed and thereby the mechanical properties of the cast workpiece. A higher hardness and material strength is obtained with decreasing temperature.

The invention claimed:

1. A method of making a crankshaft for a diesel engine, the method comprising the steps of sequentially:
   producing from austempered ductile cast iron a cast workpiece with undersized surfaces that form bearing surfaces for connecting rods and shaft bearings,
   thereafter heat treating the cast workpiece to impart to it high strength and hardness,
   thereafter applying a coating to the undersized bearing surfaces while matching a thickness of the coating to the undersize and to dimensional deviations of the respective bearing surfaces resulting from the heat treatment, and
   thereafter finish-machining the coated bearing surfaces to final geometric dimensions without machining the cast workpiece.

2. The method according to claim 1 wherein the cast workpiece is produced by machining to undersize the bearing surfaces of the workpiece.

3. The method according to claim 1 wherein the heat treatment comprises the steps of:

heating the cast workpiece in a protective gas atmosphere to an austenitization temperature of 850 to 950° C., quenching the cast workpiece to a microstructural transformation temperature between 220 and 450° C. and holding the microstructural transformation temperature for several hours for isothermal transformation of the microstructure.

4. The method according to claim 1 wherein the coating is applied to the bearing surfaces with a layer thickness between 100 μm and 800 μm after the heat treatment of the cast workpiece.

5. The method according to claim 1, further comprising the step of removing 20% to 80% of the coating applied to the bearing surfaces during the finish-machining.

* * * * *